G. O. LEOPOLD.
LIFTING JACK.
APPLICATION FILED FEB. 23, 1918.

1,343,732.

Patented June 15, 1920.
4 SHEETS—SHEET 1.

Inventor:
George O. Leopold,
by his Attorneys,
Howson & Howson

G. O. LEOPOLD.
LIFTING JACK.
APPLICATION FILED FEB. 23, 1918.

1,343,732.   Patented June 15, 1920.
4 SHEETS—SHEET 2.

Inventor:
George O. Leopold,
by his Attorneys,
Howson & Howson

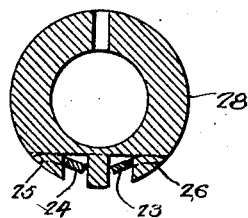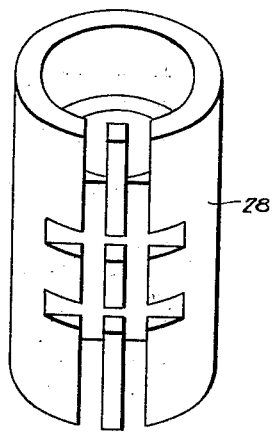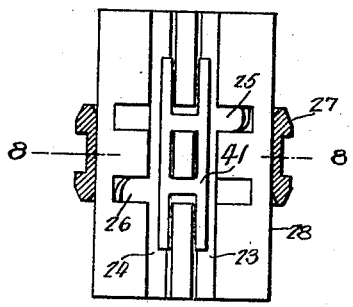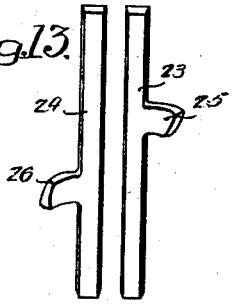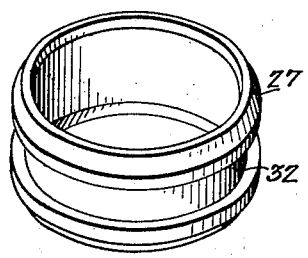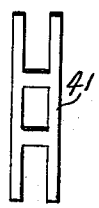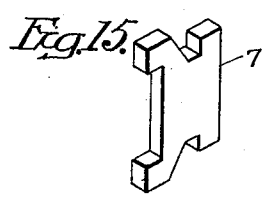

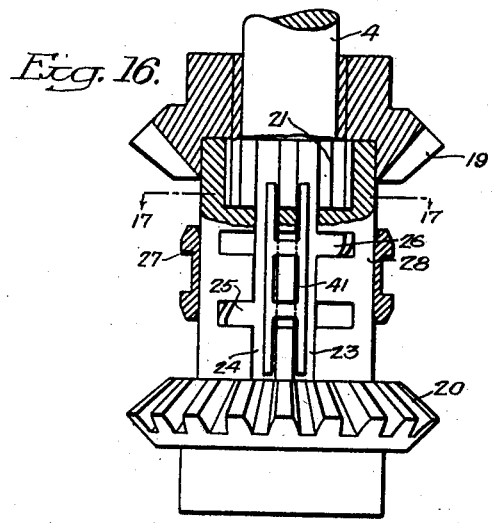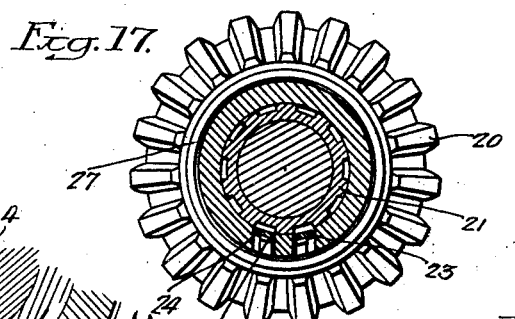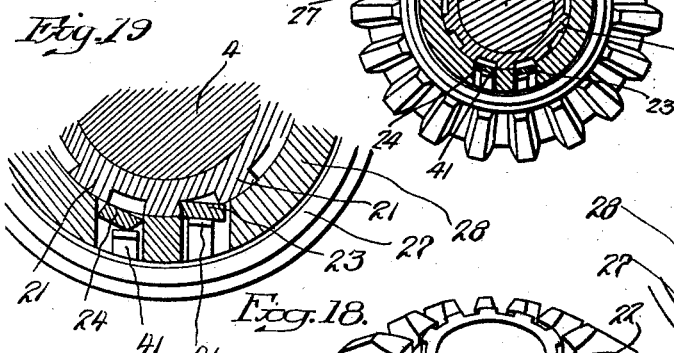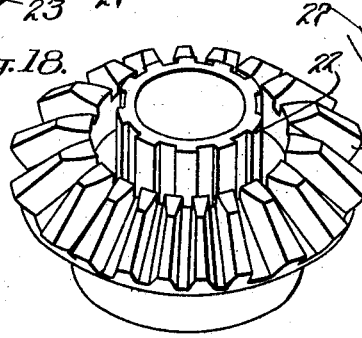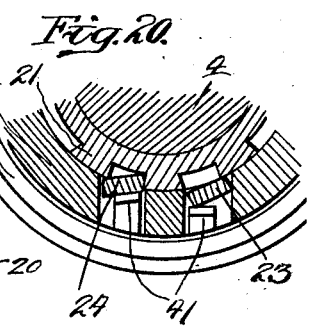

UNITED STATES PATENT OFFICE.

GEORGE O. LEOPOLD, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

LIFTING-JACK.

1,343,732.　　　　Specification of Letters Patent.　　Patented June 15, 1920.

Application filed February 23, 1918. Serial No. 218,759.

*To all whom it may concern:*

Be it known that I, GEORGE O. LEOPOLD, a citizen of the United States, residing in Philadelphia, Pennsylvania, have invented certain Improvements in Lifting-Jacks, of which the following is a specification.

My invention relates to certain improvements in lifting jacks, particularly those adapted for use in connection with lifting vehicles such as automobiles.

The object of my invention is to make a lifting jack which can be readily operated and which will firmly hold the load in the raised position, and which can be intermittently rotated through ratchet mechanism or continuously rotated as fully described hereinafter.

In the accompanying drawings:

Fig. 7 is a face view of the clutch sleeve showing the pawls in position;

Fig. 8 is a sectional view on the line 8—8, Fig. 7;

Fig. 9 is a perspective view of the shifting ring;

Fig. 12 is a detached perspective view of the clutch sleeve;

Fig. 13 is a perspective view of the pawls;

Fig. 14 is a perspective view of the spring for the pawls;

Fig. 15 is a perspective view of the key for the clutch sleeve;

Fig. 16 is a vertical sectional view through the clutch sleeve, showing the pawls engaging the beveled extensions of the beveled gear wheels;

Fig. 17 is a sectional view on the line 17—17, Fig. 16;

Fig. 18 is a perspective view of one of the beveled gears, showing the beveled extensions;

Fig. 19 is an enlarged sectional plan view showing the right pawl in engagement and the left pawl out of engagement; and Fig. 20 is a similar view, showing the left pawl in engagement and the right pawl out of engagement.

Figure 1:
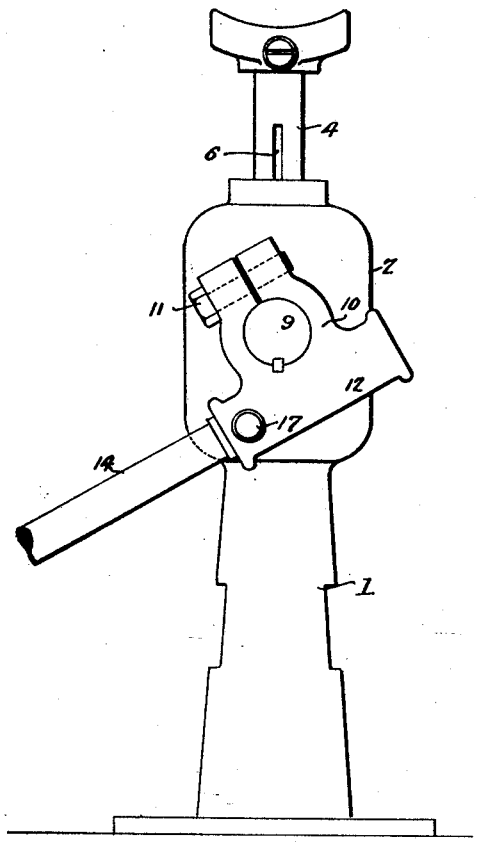
Figure 1 is a side view of my improved lifting jack.
Figure 2:
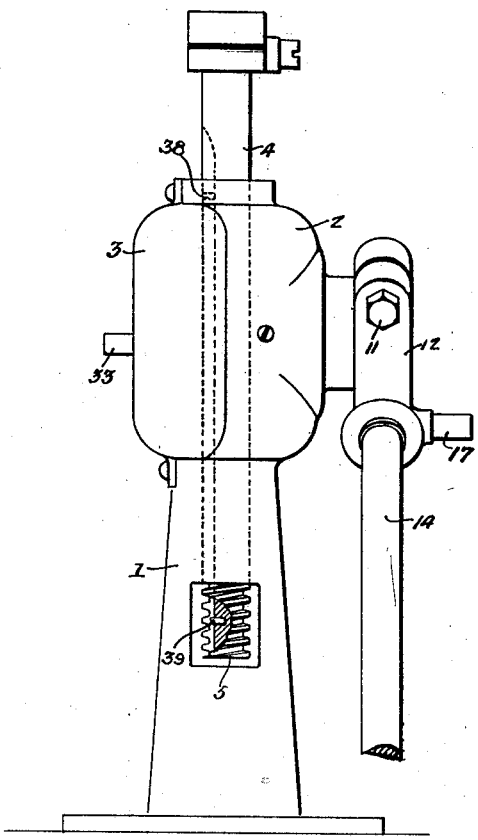
Fig. 2 is an end view.
Figure 3:
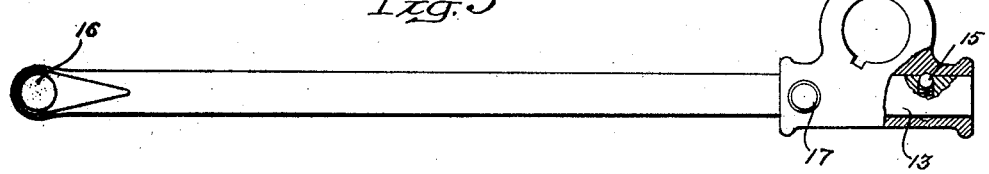
Fig. 3 is a view of the handle by which the jack is operated and showing the handle located in its socket and in the ratcheting position.

1 is the base of the lifting jack. 2 is the casing having a cap 3 which can be detached so that access can be had to the gearing. 4 is a spindle having a screw thread 5 at its lower end adapted to a threaded opening in the base and having a key-way 6 for a key 7. 8 is a swiveled head mounted on the end of the spindle and shaped to properly engage the axle or other part of the vehicle to be raised by the lifting jack.

9 is a shaft extending into the casing 2 and keyed to the outer end of this shaft is a head 10. This head is also clamped by a bolt 11. In the head is a socket 12 for the reception of the end 13 of the operating rod 14. In this operating rod is a ball 15 backed by a spring which is adapted to a recess in the socket so as to frictionally hold the rod in the socket. At the opposite end of the rod is an eye 16 adapted to a pin 17 on the socket 12, so that when this eye is placed over the pin the shaft 9 can be turned continuously by merely giving a back and forward movement to the rod. This can be used when locating the spindle of the jack in position, and when it is desired to use the ratchet mechanism all that is necessary is to remove the rod and reverse it so that the portion 13 can be slipped into the socket of the head 10.

Figure 4:
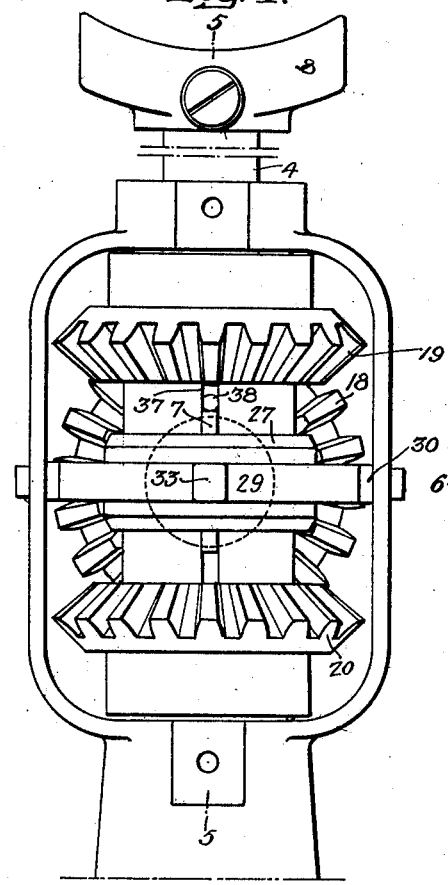
Fig. 4 is a view looking in the direction of the arrow, Fig. 5, with the cap removed.
Figure 10:
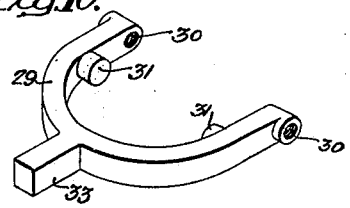
Fig. 10 is a perspective view of the shifter.
Figure 11:
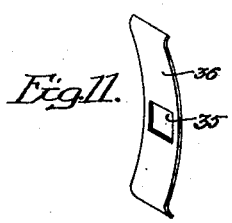
Fig. 11 is a detached perspective view of the spring for the shifter.

On the inner end of the shaft 9 is a beveled gear wheel 18 which meshes with two beveled gear wheels 19 and 20 mounted to turn freely on the spindle 4. The wheel 19 has a toothed extension 21 and the wheel 20 has a toothed extension 22. These extensions are in the form of ratchet wheels. Pawls 23 and 24, shown clearly in Fig. 13, are arranged to engage these toothed extensions and rock in the grooves of the clutch sleeve 28, as clearly shown in Figs. 7 and 8. Back of the pawls is a spring 41, Figs. 4 and 7, which yields when the pawls are rocked. The pawl 23 has a projection 25 and the pawl 24 has a projection 26. These projections are bent, as shown clearly in the figures and are so located as to be acted upon by the shifting ring 27, which slides on the clutch sleeve 28 which, in turn, is mounted on the spindle 4. The clutch sleeve is mounted between the two gear wheels 19 and 20 and the ring 27 is controlled by a shifter 29, Fig. 10, which is pivoted to the casing at 30 and has lugs 31 which enter the groove 32 in the ring 27. A projection 33 on the shifter extends through an opening 34 in the cap 3. This extension also passes through an opening 35 in a retaining spring 36, which bears against the inside of the cap and frictionally holds the shifter in any of the three positions to which it is adjusted. When the shifter is in the normal position, as shown in Figs. 7 and 16, both of the pawls are in engagement with both ratchet wheels 21 and 22.

Figure 6:
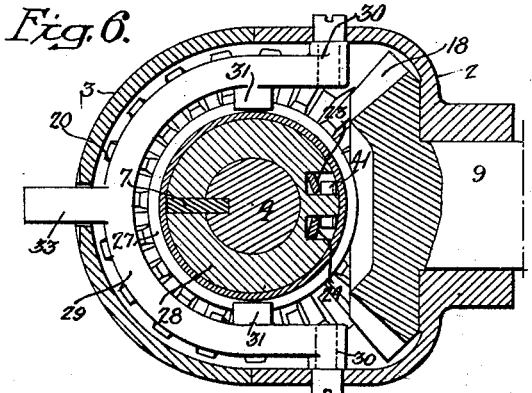
Fig. 6 is a sectional plan view on the line 6—6, Fig. 5.

When the ring 27 is in the central position it bears upon the projections 25 and 26 and holds both pawls out of action, as clearly shown in Figs. 6, 8, and 17 and when the shifter is raised then it is clear of the projections 25 of the pawl 23, while it still holds the projection 26. This releases the pawl 23 and the spring 41 forces the pawl into engagement with the ratchet teeth as in Fig. 19. When the shifter is lowered it is moved clear of the projection 26 of the pawl 24, while the projection 25 is still held and the spring 41 will force the pawl 24 in engagement with the ratchet teeth of the wheels as in Fig. 20.

Figure 5:
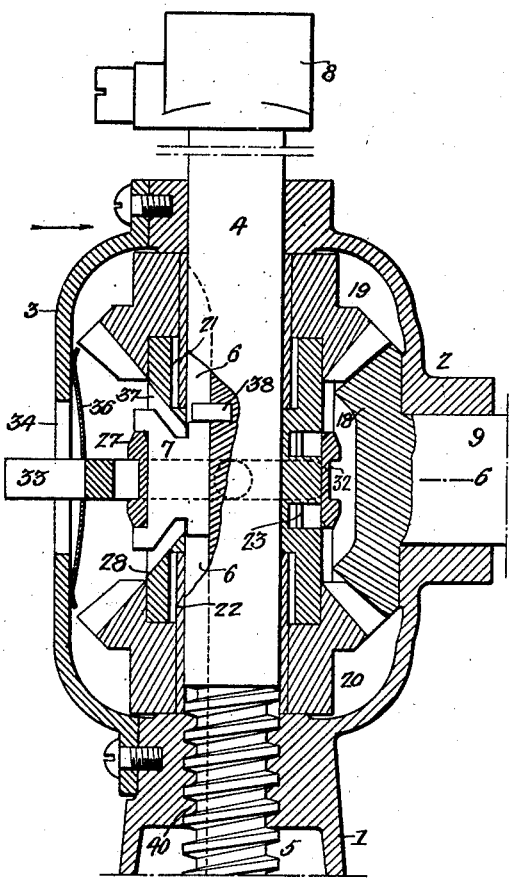
Fig. 5 is a sectional view on the line 5—5, Fig. 4.

The key 7 is adapted to the key-way 6, as hereinbefore remarked, and extends through an opening 37 in the clutch sleeve and is recessed to receive the clutch ring, as clearly shown in Figs. 5 and 15, and on the upper end of the spindle is a pin 38 which, when the spindle is lowered, strikes the key 7 and forces it down, carrying with it the shifting ring 27, moving it from the elevated position to the neutral position and throwing the mechanism out of action. Secured to the lower end of the spindle 4 is a pin 39 which projects a sufficient distance to engage the key 7 when in its extreme upper position and will raise the key to bring the sleeve 27 in neutral position and stop the feeding.

The screw thread 5 in the lower portion of the spindle 4 is adapted to the screw threaded opening 40 in the upper end of the base 1, shown clearly in Fig. 5, and as this spindle is keyed to the clutch sleeve it turns with the clutch sleeve at all times, but is free to move vertically as it is turned, and the direction of movement is controlled by the shifter which moves the clutch ring 27 up or down or into mid-position, as desired.

By the above construction, the spindle can be raised on reciprocating the shaft 9 when the shifting ring 27 is in the raised position. The ratchet mechanism first engages one wheel and then the other as the shaft is reciprocated, causing a constant movement in one direction. By shifting the ring 27, then the other pawl is in engagement with the ratchet wheels and the spindle is lowered by a continuous movement on the reciprocation of the shaft 9. The spindle can be raised or lowered by a short reciprocating motion or it can be raised and lowered by a continuous rotary motion of the shaft 9.

I claim:

1. The combination in a lifting jack, of a base having a screw threaded opening; a casing mounted on the base; a spindle having a screw threaded portion extending through the threaded opening in the base and extending through the casing; a clutch sleeve mounted on the spindle; a key adapted to a key-way in the spindle so that the spindle will turn with the clutch sleeve but will be free to move longitudinally therein; a gear wheel above and below the sleeve; means for turning said gear wheels, each of said gear wheels having ratchet teeth on its hub; pawls mounted in the clutch sleeve and arranged to engage the ratchet teeth; a shifter; and a shifter sleeve controlling the pawls.

2. The combination of a base having a screw threaded opening therein; a casing mounted on the base; a slotted spindle extending through the casing and having a threaded portion adapted to the threaded opening in the base; a clutch sleeve; a gear mounted above and below the clutch sleeve and arranged to rotate freely on the spindle, said gears having ratchet teeth; pawls carried by the clutch sleeve and arranged to engage the ratchet teeth of the gears; a ring for shifting the pawls; a key extending into the slot in the spindle and extending through the sleeve and engaging the ring; and a pin on the spindle arranged to come in contact with the key and automatically shift the sleeve and the mechanism when the spindle reaches its lowest position.

3. The combination of a base having a threaded opening therein; a casing on the base; a spindle extending through the casing and having a threaded portion extending through the opening in the base and having a longitudinal slot therein; a clutch sleeve mounted on the spindle; two bevel gear wheels loosely mounted on the spindle and a driving bevel wheel meshing with the first mentioned bevel wheels; a shifting ring and a shifter; pawls mounted in the clutch sleeve and arranged to be acted upon by the clutch ring; a key extending through the clutch sleeve and into the longitudinal slot in the spindle and engaging the clutch ring; a pin at the upper end of the spindle and a pin at the lower end of the spindle arranged to engage and shift the key when it reaches its two extreme positions, the upper pin reversing the movement of the parts and the lower pin bringing the key to its neutral position.

4. The combination in a lifting jack, of a base; a spindle and ratcheting mechanism for raising and lowering the spindle; a shaft for driving said ratcheting mechanism; a head on the shaft, said head having a socket and a pin; and a handle, one end of the handle being adapted to the socket and the other end being adapted to the pin so that the shaft can be either continuously rotated or reciprocated.

In witness whereof I affix my signature.

GEORGE O. LEOPOLD.